United States Patent

Kessler et al.

[11] Patent Number: 4,476,973
[45] Date of Patent: Oct. 16, 1984

[54] AUTOMATIC RECIPROCAL FEED MECHANISM

[75] Inventors: Sheldon Kessler, Chicago; Vasilios Strubulis, Des Plaines, both of Ill.

[73] Assignee: Pack-All, Inc., Chicago, Ill.

[21] Appl. No.: 364,437

[22] Filed: Apr. 1, 1982

[51] Int. Cl.³ .............................................. B65G 25/00
[52] U.S. Cl. .................................................. 198/744
[58] Field of Search ........................ 198/718, 744, 487

[56] References Cited

U.S. PATENT DOCUMENTS

| | | | |
|---|---|---|---|
| 1,941,986 | 1/1934 | Janson | 198/744 X |
| 2,668,614 | 2/1954 | Lawson | 198/744 X |
| 3,090,481 | 5/1963 | Biel et al. | 198/744 |
| 3,473,645 | 10/1969 | Kidd | 198/718 |
| 3,570,656 | 3/1971 | Manetta | 198/744 X |

Primary Examiner—Joseph E. Valenza
Assistant Examiner—Dennis Williamson
Attorney, Agent, or Firm—Marvin N. Benn; Milton S. Gerstein

[57] ABSTRACT

The apparatus for sequentially advancing a plurality of articles across a feed table to a work station includes an input station for receiving articles deposited on the feed table, a reciprocating pusher assembly adapted to engage and advance the articles across the feed table from the input station when driven in a forward direction and to disengage from the article when driven in reverse, and an air cylinder-piston drive mechanism for the pusher assembly whereby the length of stroke of the piston and the pusher assembly is selectively variable. The pusher assembly includes a plurality of removable pushers each of which is relocatable at varying intervals along the longitudinal axis of the pusher assembly, and a mechanism for laterally adjusting the position of the pusher assembly to maintain an in-line feed mode regardless of the width of the articles being advanced along the feed table.

24 Claims, 8 Drawing Figures

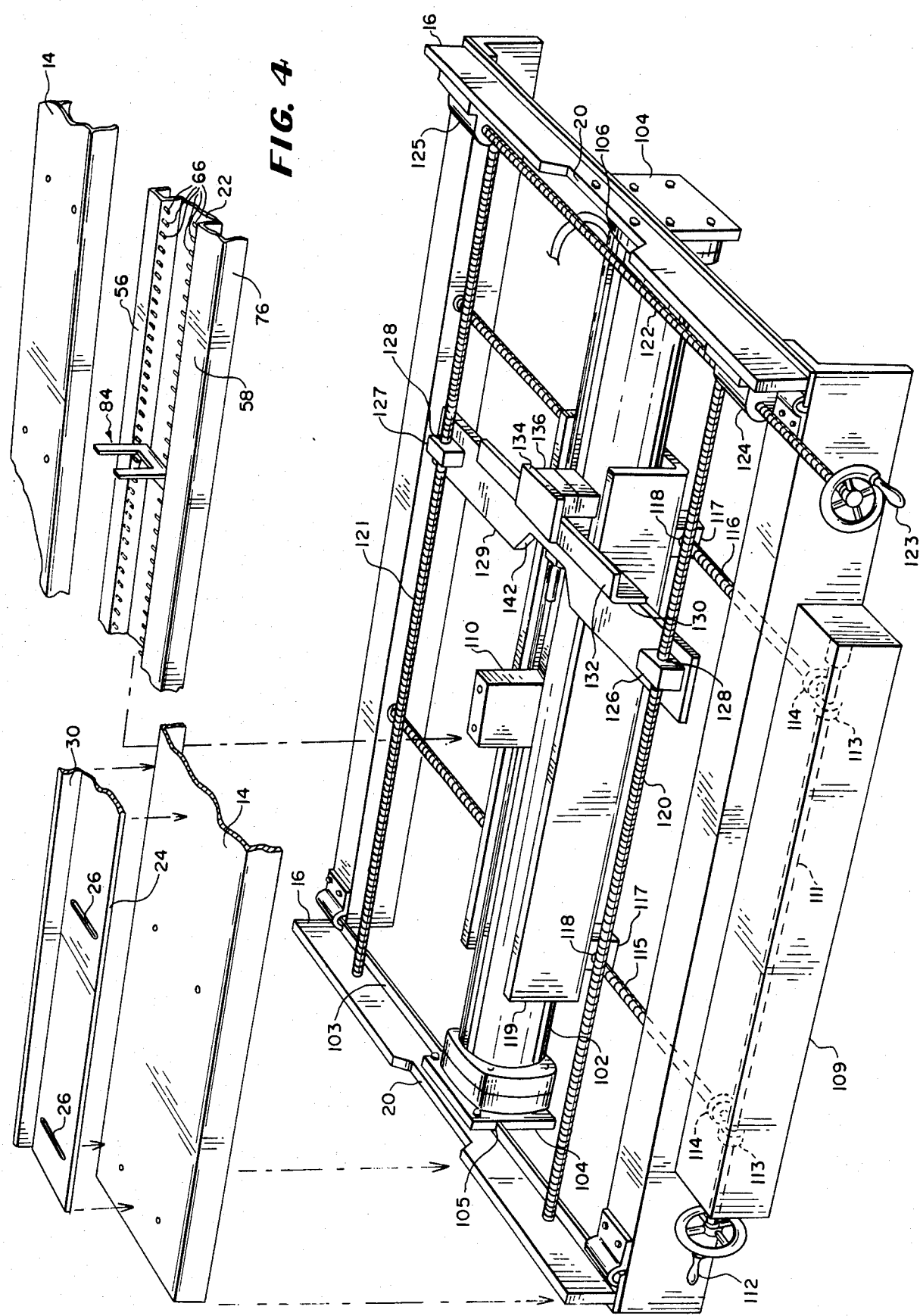

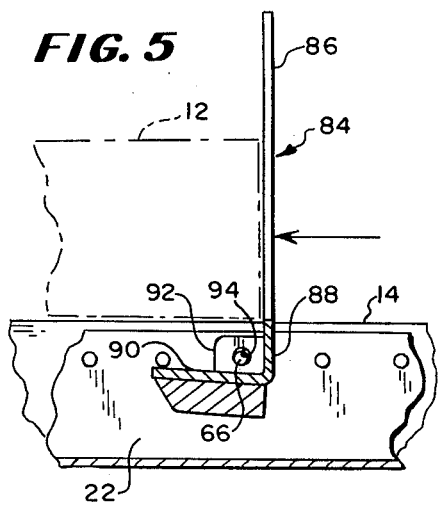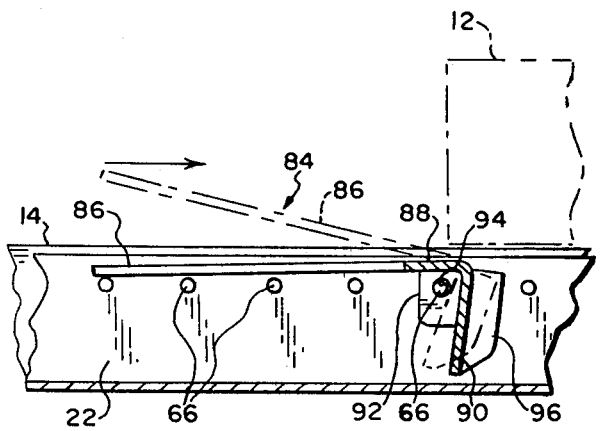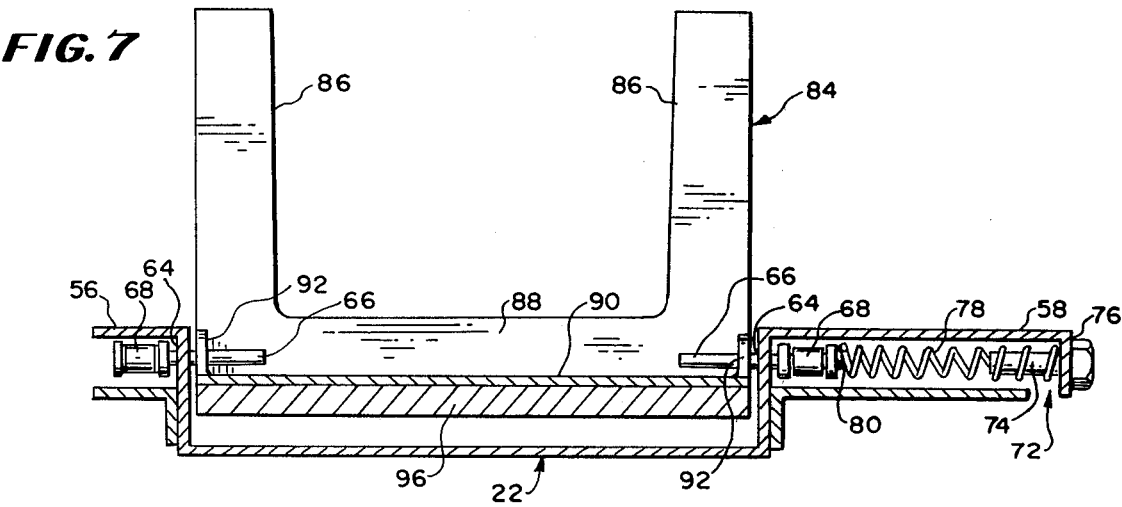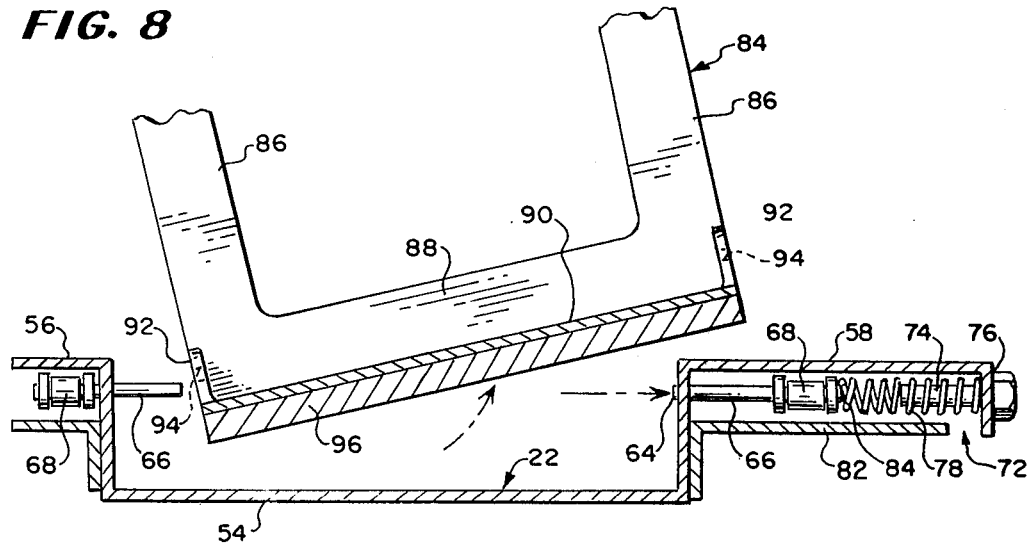

AUTOMATIC RECIPROCAL FEED MECHANISM

TECHNICAL FIELD

The present invention relates to an automatic, variable stroke, laterally adjustable, reciprocating feed mechanism and control device therefore for advancing a plurality of articles to be packaged into the wrapping area of an inline film sealing machine which wraps and heat seals a plastic film entirely around each article.

BACKGROUND ART

Heretofore many conveyance mechanisms have been proposed for advancing articles to be packaged into the wrapping area of an automatic film sealing machine. These devices are particularly adapted for use in conjunction with apparatus for wrapping an article in a clear plastic film, and then sealing and shrinking the film around the article through the application of heat.

The previously proposed conveyance mechanisms are designed to advance an article to be wrapped from an infeed station, such as a hopper, movable conveyor belt, or gravity feed system, then across a flat or horizontal surface or feed table, and into a wrapping and sealing area where the plastic film is extended and sealed over all surfaces of the item to be packaged.

Several mechanisms are used for, first advancing an article to the wrapping area, next, retracting or disengaging the advancing mechanism from the article once the article is in the wrapping area, and then, returning the mechanism to its original position to engage and advance the next sequential article from the feed table into the wrapping ara. Retraction of the moving, or pusher mechanism upon placement of the article in the wrapping area is required to prevent the mechanism from interfering with the film wrapping operation.

More specifically, in the automatic film sealing machines of the type with which the apparatus of the present invention is used, a center-folded sheet of thin, clear plastic film is delivered from a supply roll to a wrapping and sealing station. Prior to delivery to this station, the film is inverted by being passed over an inverting head whereby a pocket is opened and formed between the folded halves of the film. The article to be wrapped is advanced into the pocket formed by the folded halves of the film, whereby the film extends above, beneath, and also one side of the article. Upon reaching the wrapping and sealing station, the film is wrapped completely around all sides and edges of the article and a sealing apparatus heat seals the upper and lower portions of the film into tight engagement around the article. The machines presently available for accomplishing this wrapping operation provide for continuous, rapid feed of articles to be wrapped through the various stations of the machine. A typical plastic film heat sealing apparatus is disclosed in U.S. Pat. No. 3,490,981.

One important element of such machines is a device for advancing the article to be wrapped into the pocket formed by the inversion of the folded sheet of plastic film, which as stated above, extends both above and below the article to be advanced. Standard endless conveyor belt advancing mechanisms are unsuitable for this purpose, since conveyor systems would not permit the application of a sealing film on both the upper and lower surfaces of the article being wrapped. The type of wrapping machine described above, therefore, requires a retractable, preferably reciprocating, pusher advancing device which inserts the article to be wrapped into the pocket formed by the folded sheet of film, and then retracts so as not to interefere with the next article to be advanced in an in-line feeding operation. The advancing device ultimately returns to its original position upon completion of the retraction operation, whereby the next article is engaged and can be advanced into the continuously supplied film pocket.

Several devices have heretofore been provided for advancing an article into the wrapping station of the type of sealing machines described. For example, certain manufacturers have devised mechanical pusher control assemblies which rise upward and retract rearwardly over and above subsequent articles on the feed table at the completion of an advancing operation. These devices utilize complicated crank-and-arm operated mechanism systems which comprise many moving parts and which have fixed stroke lengths that are incapable of adjustment to accommodate articles of varying lengths.

Still other advancing mechanisms which are currently available comprise pneumatically controlled systems including air piston and rod devices which also retract the pusher assembly over and above subsequent articles on the feed table at the end of an advancing operation. These devices also provide no adjustable means to allow the control stroke to be varied to accommodate various sized articles. Further, these prior systems also fail to provide means to adjust the position of the pusher itself to operate more efficiently when articles of varying length are advanced through the wrapping and sealing stages.

One such particular prior device currently available incorporates a pusher connected to an air cylinder piston arm mechanism, whereby the pusher is reciprocally driven across the feed table of a sealing machine. When the pusher has advanced the article to be wrapped into the wrapping area of the sealing machine, the pusher stops its forward motion, and is rotated 90° through an arc to lift the pushing device over the adjacent articles on the feed table as the advancing mechanism is retracted. Upon reaching the start position, the pushing mechanism is counter-rotated 90° whereby it is positioned behind the next article to be wrapped. Forward motion of the pusher, under the control of the air cylinder-piston arm combination, then moves the next article into the wrapping area. For obvious reasons, the height of articles to be wrapped by this device is limited, since the pusher must travel over the subsequent articles during its return movement. The articles to be wrapped can be no higher than the vertical distance between the feed table and the path of travel of the pusher as it is moving rearward. In addition, the type of pusher described is characterized by a fixed reciprocal stroke, and is not adjustable to accommodate varying sizes of items moving across the feed table.

Another mechanism for advancing articles in prior wrapping and sealing apparatus includes combination pneumatically operated cylinder and mechanical lever and cam operated pusher assemblies which move across a feed table of a sealing machine, pushing an article to be wrapped across the feed table, and being elevated after the article has been advanced to return the pusher assembly over subsequent articles to be fed to its initial position. These pusher assemblies, as the one previously described, do not provide means for adjusting the stroke of the pusher assembly, nor of providing means for advancing more than one article at a time towards the wrapping station.

Yet another reciprocal device for advancing an article across the feed table of a plastic film sealing machine is disclosed in U.S. Pat. No. 3,583,888, wherein an air cylinder-pulley system drives a single, offset pusher back and forth across the table. In this mechanism, only one article at a time is advanced across the table, and the pusher must be fully retracted prior to depositing a subsequent article on the feed table. It is obvious that the delay in feeding articles to the wrapping station does not allow for maximum efficiency of operation.

Other commonly available devices for advancing articles to be packaged into a wrapping area of an automatic sealing apparatus include continuously rotating belt, and conveyor or chain-and-sprocket drive mechanisms, which are non-reciprocating and do not provide the degree of flexibility of operation afforded by the device of the present invention. Representative prior art devices such as described above are disclosed in the following issued U.S. patents:

| U.S. Pat. No. | Patentee |
| --- | --- |
| 3,457,699 | Kinney, et al. |
| 3,587,829 | Sorensen |
| 3,851,445 | Schuk |
| 4,196,561 | Kruse |

None of the feed mechanisms disclosed in the above patents would be suitable for use in wrapping and sealing machines wherein the article to be wrapped must be inserted inside the pocket of a folded length of plastic film, where the film extends both above and below the article to be wrapped. In the devices disclosed in the above patents, the lower surface of the article being moved is supported by the advancing mechanism, and no film can be inserted between the article and its bottom support.

Various reciprocating feed mechanisms have been previously developed. However, these mechanisms are not specifically designed to include easily adjustable pushing arms which can be readily relocated to accommodate varying sized articles moving along a feed table toward the wrapping station. In such devices, the time required to move a quantity of articles across a feed table to a wrapping station is greatly increased due to the gaps or spaces between articles on the feed table as they are being fed by pushers which remain a fixed distance apart. Typical of the type of reciprocating feed system referred to is disclosed in Happel U.S. Pat. No. 1,631,125.

As described in greater detail hereinafter, the apparatus of the present invention differs from the Happel device by providing removable and repositionable pushers in combination with a variable stroke reciprocating drive for the pusher assembly. Also, the Happel structure does not allow the speed of the advancing operation to be modified to increase the efficiency of the device in accordance with the size of the articles being advanced.

Other presently available reciprocating feed mechanisms for use with package sealing machines have a fixed distance or stroke over which they travel, and do not provide a means for shortening or lengthening the stroke to accommodate varying sizes of packages. The longer the stroke of each pushing step, the longer each feed operation takes, which extends the total time for completing the wrapping and sealing process.

As will be described in greater detail hereinafter, the apparatus of the present invention provides a device including pushers for advancing an article to be wrapped across the feed table of an automatic wrapping and sealing machine, including mechanisms for varying the distance between the pushers on an advancing assembly and for varying the length of stroke of the advancing assembly. This allows adjustment of the time for feeding the articles into a wrapping station in accordance with the size of the articles, which in turn produces greater efficiency and economy of operation. In addition, the apparatus of the present invention includes an advancing mechanism which is capable of simultaneously advancing a plurality of articles to be wrapped across the feed table to an automatic wrapping and sealing apparatus.

DISCLOSURE OF INVENTION

The reciprocating feed apparatus of the present invention differs from previous feed mechanisms for similar purposes, particularly those used in association with automatic wrapping and sealing machines, by providing, in combination, an adjustable stroke reciprocating drive mechanism for a pusher assembly, removable and relocatable pushers disposed along the longitudinal axis of the pusher assembly, and a selectively adjustable control for shifting the lateral position of both the drive mechanism and pusher assembly, whereby three separate but interrelated adjustments can be made to the reciprocating feed apparatus of the present invention to increase the efficiency and economy of operation of the apparatus. In particular, the distance between pushers disposed along the longitudinal axis of the pusher assembly, the length of each stroke of reciprocating motion of the pusher assembly, and the lateral position of the center line of the pusher assembly and drive mechanism can be readily adjusted, either individually or together, to accommodate the advancement of articles of varying sizes across the feed table.

According to the present invention there is provided an apparatus for sequentially advancing a plurality of articles deposited one at a time on one end of a feed table across the feed table to a work station comprising a reciprocating pusher assembly mounted on the feed table and adapted to engage and advance each article across the feed table from the one end when driven in a forward direction and to disengage from the article when driven in reverse; drive means to reciprocally drive said pusher assembly; and said pusher assembly including adjustably mounted pushers which are removable and relocatable at varying intervals along the longitudinal axis of the pusher assembly.

Also according to the present invention there is provided adjustable control means for selectively varying the distance the pusher assembly travels during each stroke of reciprocal movement, such that the length of each stroke of the pusher assembly and the interval between the relocatable pushers can be coordinated to accommodate the advancement of articles of varying sizes.

Further according to the present invention the apparatus includes a rodless air cylinder and piston device for driving the pusher assembly, a laterally adjustable device for supporting the air cylinder and piston relative to the feed table, and selectively adjustable controls connected to the support device for changing the lateral position of the air cylinder and pusher assembly connected thereto, whereby the articles being advanced across the feed table are maintained in an in-line feed mode regardless of the width of the articles.

Still further according to the present invention the pusher assembly for advancing articles from an input station to a work station of a feed table includes drive means to reciprocally drive the pusher assembly in a forward and reverse direction, and a plurality of substantially L-shaped pushers each having a short leg and a long leg and each said pusher being pivotally and removably mounted to the pusher assembly along the longitudinal axis thereof and adapted for 90° rotation relative to the pusher assembly, the longer leg of each of the L-shaped pushers normally being in an upright article engaging position and being rotated from an upright position for advancing an article on the feed table when the pusher assembly is driven in a forward direction, to a horizontal position for passage beneath a subsequent article on the feed table when the pusher is driven in reverse and said longer leg engages and pivots under the subsequent article.

BRIEF DESCRIPTION OF DRAWINGS

FIG. 4 is an exploded perspective view of the feed mechanism and feed table shown in FIG. 1, and illustrates the rodless air cylinder drive which is connected to and provides reciprocal movement for the pusher assembly, and an adjustable stop assembly for controlling the stroke of the air cylinder and consequently the length of each stroke of the pusher assembly according to the size of the articles being fed;

FIG. 5 is a cross-sectional detail view of a portion of a pusher and illustrates the upright position of a pusher when it is advancing an item across the feed table;

FIG. 6 is a similar cross-sectional view of pusher similar to the view shown in FIG. 5, and shows the retracted position of the pusher after an article has been fed across the feed table, and the pusher is moving in reverse direction to reposition the pusher to advance the next sequential article to be fed across the feed table;

FIG. 7 is a vertical sectional view of the pusher assembly of the present invention, taken along line 7—7 of FIG. 3, and illustrates the means for pivotally and releaseably attaching a pusher to a pair of opposed pins, one of which is resiliently biased toward the other; and FIG. 8 is a vertical sectional view of the pusher assembly similar to the view shown in FIG. 7, and shows how a spring loaded pin is moved to a retracted position thereof enabling removal and relocation of the pusher.

BEST MODE FOR CARRYING OUT THE INVENTION

Figure 1:
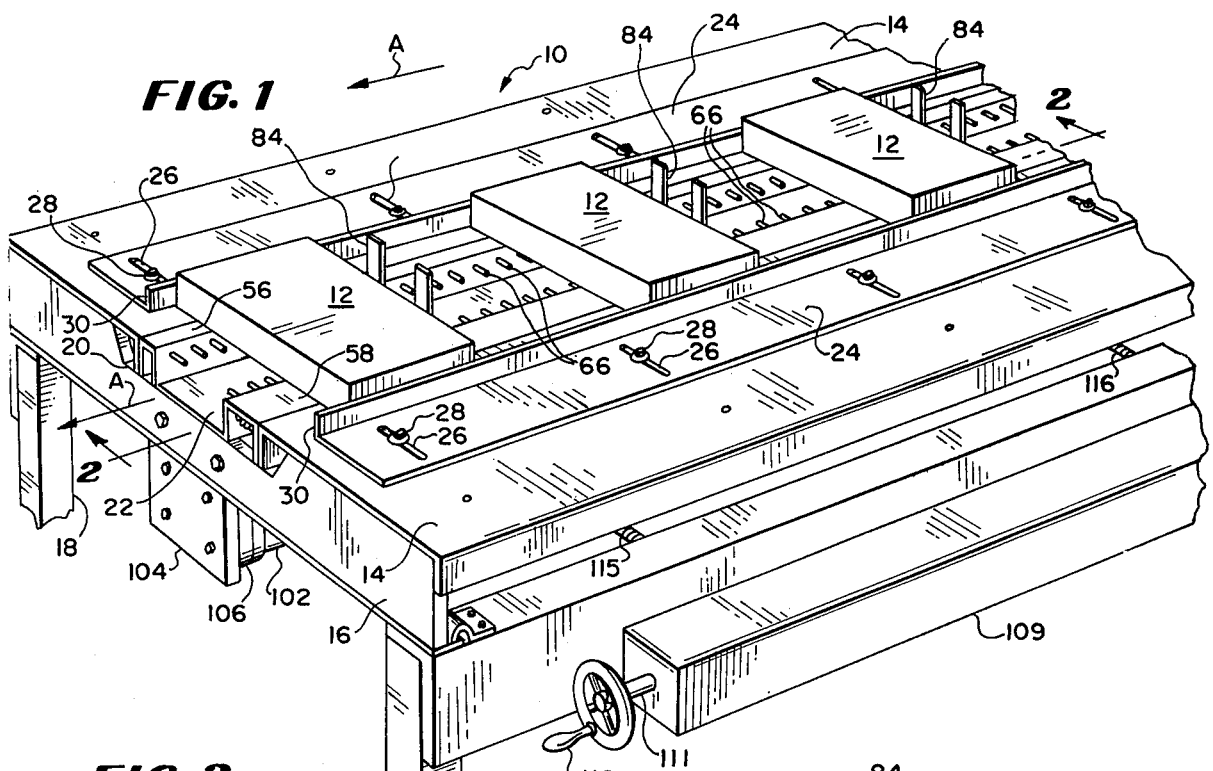
FIG. 1 is a front perspective view of the reciprocal feed mechanism of the present invention mounted on an article feed table, and shows articles being advanced across the feed table and an adjustable channel for guiding the longitudinal movement of the articles across the feed table.

Referring now to FIG. 1, there is illustrated therein a section of a feed table, generally designated by reference numeral 10. The feed table 10 forms part of a machine designed to advance articles 12 to be wrapped in an automatic wrapping and sealing machine, not shown. One type of apparatus with which the machine is intended to be used is the sealing and wrapping machine disclosed in U.S. Pat. No. 3,583,888. However, it is understood that a machine with feed table 10 can be utilized in any type of system which requires the advancement of articles across a feed table or platen, i.e., the sequential advancement of articles from an input station to a work station.

The feed table 10 comprises a pair of substantially flat, horizontal, longitudinally extending feed surfaces 14 supported by end plates 16 and legs 18. The end plates 16 each have a cut-out portion 20 in which a pusher assembly 22 constructed according to the teachings of the present invention is disposed, for longitudinal and lateral movement relative to feed surfaces 14, as will be described in more detail hereinafter.

Two movable guide plate members 24 are mounted on top of feed surfaces 14 parallel to and adjacent pusher assembly 22. Guide plate members 24 each include a plurality of slots 26 through which bolts 28 extend to adjustably secure the guide plate members 24 to the feed surfaces 14. By loosening bolts 28, guide plates 24 can be manually moved laterally to adjust to varying widths of articles 12 being advanced by pusher assembly 22, as will be described. Each guide plate member 24 comprises a vertically extending flange 30 which is adapted to abut the lateral edges of either side of articles 12 as they advance across the feed table 10 in the direction indicated by the arrow A in FIG. 1, and guide articles 12 as they advance.

Figure 2:
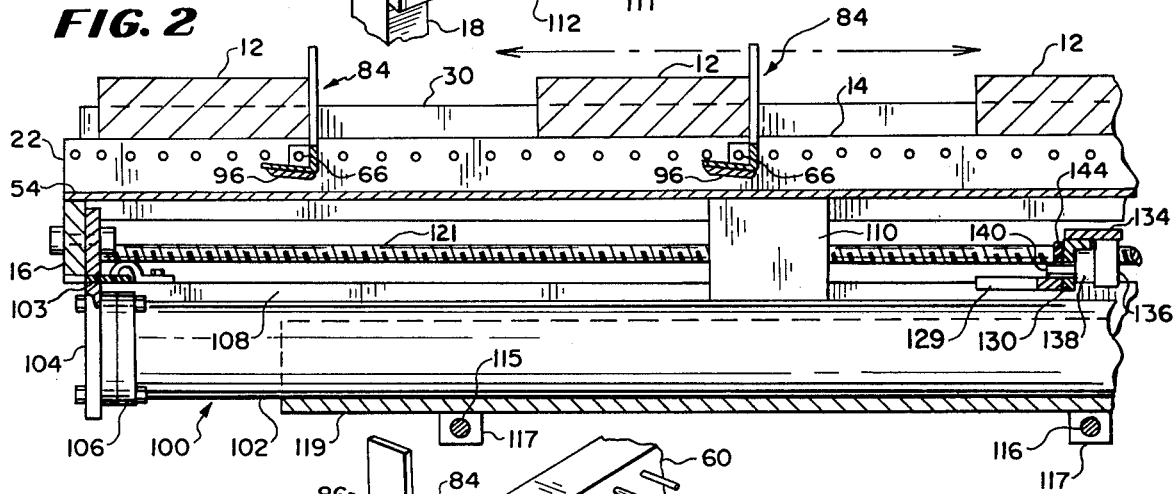
FIG. 2 is a partial sectional view of the feed mechanism of FIG. 1, taken along line 2—2 of FIG. 1, and illustrates the relation between the reciprocal pusher assembly of the feed mechanism, the removable pushers of the assembly pivotably mounted to a plurality of pins disposed along the length of the pusher assembly, and the connection between the pins and a rodless air cylinder drive which reciprocally drives the pusher assembly.
Figure 3:
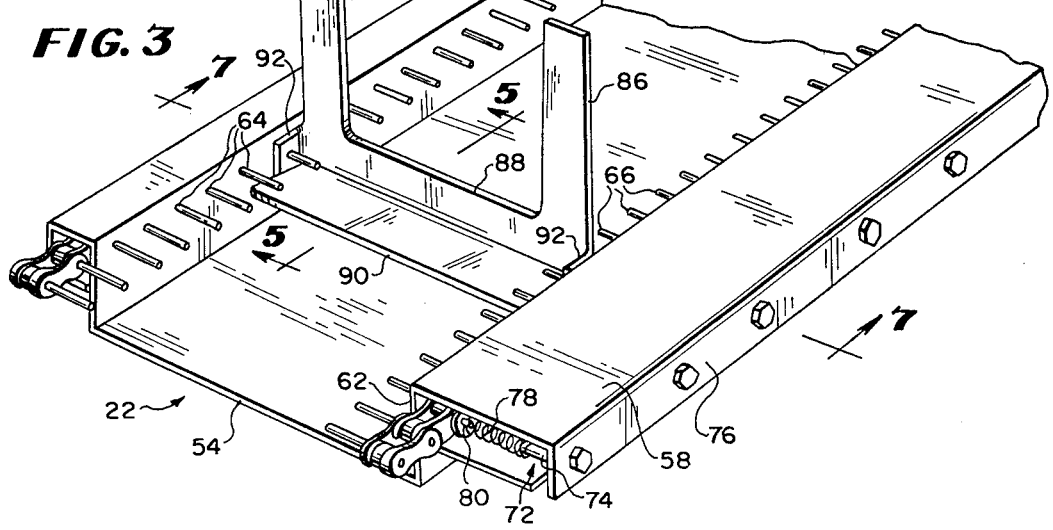
FIG. 3 is a perspective view of the front end of the pusher assembly shown in FIGS. 1 and 2, particularly illustrating the manner in which the pushers are removably attached to the pusher assembly.

Referring now to FIGS. 1, 2 and 3, pusher assembly 22 is mounted on a generally U-shaped channel member 54, which channel member 54 in turn is slideably mounted in cut-out portions 20 of end plates 16 for longitudinal and lateral movement relative to feed surface 14. Each of the outer sides of channel member 54 are provided with longitudinally extending, smaller, inverted U-shaped channel portions 56, 58 (FIG. 3). For purposes to be explained, U-shaped portion 58 is considerably wider than portion 56.

Vertically extending sides 60, 62 of channel member 54 contain a plurality of aligned, relatively closely spaced apertures 64 through which a plurality of pin or pin members 66 extend into the central cavity of channel member 54. The pin members 66 which extend along the face of vertically extending side 60 are fixed to side 60 and are incapable of movement relative thereto. Conversely, pins 66 which extend through apertures 64 in vertically extending side 62 are mounted for movement laterally of the longitudinal axis of assembly 22 and axially of each pin member 66, in and out of each corresponding aperture 64. To this end, each pin 66 along side 62 is fixed to a laterally flexible member 68 inside channel portion 58. In the preferred embodiment, as best seen in FIG. 3, flexible member 68 comprises a link chain, similar to that found on a standard bicycle drive. Pins 66 are attached to the pivot pins 70 joining each segment of chain member 68.

The flexible member 68 disposed in channel portion 58 is mounted for lateral movement on a plurality of spring loaded assemblies 72 which bias the flexible member 68 toward an extended position of pins 66, but allow pins 66 to be retracted for removal and replacement of a pusher (84) as will be explained.

As best seen in FIGS. 3, 7 and 8, a plurality of spring loaded assemblies 72 are mounted to channel portion 58 in spaced relation along the length of the channel portion 58. Each spring loaded assembly 72 comprises a screw or pin 74 mounted on a downwardly extending flange 76 of channel portion 58. A coil spring 78 is disposed over pin 74 and extends outward towards flexible member 68, which the spring abuts at points 80. Pin 74 is purposely cut short to allow flexible member 68 to move rightward (as viewed in FIGS. 7 and 8) when pin members 66 are pushed against the bias of springs 78. A protective cover plate 82 is attached to channel portion 58 and extends substantially beneath spring loaded assemblies 72 to prevent damage to the flexible member 68 and the spring loaded assemblies. For purposes of the present invention, flexible member 68 can be a continuous section of chain extending the length of channel portion 58, or may be divided into several sections of shorter length.

The function of pins 66 is to permit a plurality of pushers 84 to be rotatably and removably mounted to pusher assembly 22. With reference to FIGS. 2, 3 and 5–8, each pusher 84 is generally L-shaped in configuration and comprises a pair of upwardly extending arms or fingers 86 forming one leg of the L mounted to a horizontally extending base 88. A flange 90 extends laterally across base 88, and outwardly therefrom to form the other and shorter leg of the L. At either lateral end of flange 90 and base 88 is a vertically extending pivot mount or socket 92 affixed to both the base 88 and the flange or leg 90. Each pivot mount 92 comprises an aperture 94 through which pin members 66 of pusher assembly 22 extend, whereby each pusher 84 is pivotally mounted on pins 66.

As best seen in FIG. 5, each pusher 84 is weighted to utilize the forces of gravity to maintain the pusher in an upright vertical position. To this end, each pusher 84 includes a weight 96 mounted beneath flange or leg 90, which produces a tendency for each pusher 84 to rotate in a clockwise direction (FIG. 5). However, the leg 90 is long enough to extend to the adjacent pin 66, which prevents the pusher 84 from rotating clockwise beyond its upright vertical position. As viewed in FIG. 6, however, the pusher 84 is capable of pivoting 90° counter-clockwise, as shown in FIG. 6, until arms 86 come to rest on pins 66 of assembly 22.

Reciprocal movement of pusher assembly 22 relative to feed surface 14 is controlled by a rodless air cylinder assembly, generally designated by the numeral 100. In the preferred embodiment of the invention, air cylinder 100 is of the type manufactured by Origa Corporation and designated Origa Rodless Cylinder Type P120 S/22. Other equivalent reciprocal drive mechanisms can be utilized without varying from the scope of the present invention. The air cylinder assembly 100 comprises a cylinder 102 mounted between two mounting plates 104 which are attached for lateral movement to end plates 16 of feed table 10. Each mounting plate 104 includes a block 106 into which cylinder 102 extends. Each end plate 16 includes an inwardly facing rail member 103, and each mounting plate 104 comprises a corresponding slot 105 which rides laterally over rail 103.

Cylinder 102 comprises a slot 108 which extends along the entire length thereof (FIG. 4), through which a piston 110 extends. As pressurized air is delivered to one side or the other of piston 110 in cylinder 102, piston 110 is selectively moved backwards or forwards in slot 108. Piston 110 is rigidly fixed to the underside of pusher assembly 22, whereby reciprocal movement of piston 110 in slot 108 causes corresponding reciprocal movement of pusher assembly 22 in channel 54 relative to feed surface 14.

A control mechanism is provided to laterally shift pusher assembly 22 in either direction to ensure that pusher assembly 22 always engages articles 12 at their centerline. Adjustment of the centerline of the pusher 84 is also important in maintaining the articles in line as they are advanced to the wrapping station. Referring to FIGS. 1 and 4, the control mechanism includes a control shaft 111 mounted on one side of feed table 10 in a housing 109. Shaft 111 is manually rotated by handle 112, and has two gear members 113 rigidly fixed thereto at spaced intervals as shown in FIG. 4. Gears 113 mate with and drive a pair of corresponding gear members 114 which are fixed on the ends of a pair of threaded shafts 115, 116. A pair of mounting blocks 117 are mounted on each threaded shaft 115, 116, which blocks 117 include threaded apertures 118 therethrough which mate with the threads on shafts 115, 116 to form a driving connection.

Each of the four mounting blocks 117 is fixed to the underside of a laterally movable, generally U-shaped cradle 119. Cylinder 102 is supported by and fixed to cradle 119 (FIGS. 2, 4). As handle 112 is rotated, cradle 119 moves laterally over a short path in either direction to adjust the centerline of air cylinder 102 and pusher assembly 22 relative to feed surface 14. Upon shifting the cradle 119 and cylinder 102, mounting plates 104 slide along rails 103 until cylinder 102 and pusher assembly 22 are relocated in their desired lateral position.

A major aspect of the present invention is the provision of means to adjust the distance over which piston 110 travels in its rearward stroke, such that the reciprocal movement of pusher assembly 22 will be commensurate with the length of articles 12 being advanced across feed table 10. Referring to FIGS. 2 and 4, a pair of threaded shafts 120, 121 are rotatably mounted between end plates 16 and extend along the full length of feed table 10. Shafts 120, 121 are manually rotated by means of a laterally extending threaded shaft 122, which is controlled by handle 123. Geared junction boxes 124, 125 transmit the rotation of shaft 122 to shafts 120 and 121 through conventional gear mechanisms.

A pair of blocks 126, 127 are mounted for longitudinal movement along shafts 120 and 121 respectively. Each block 126, 127 comprises a threaded aperture 128 therethrough, having internal threads which mate with the external threads on shafts 120 and 121. As shafts 120 and 121 are rotated by handle 123, blocks 126, 127 move in unison along shafts 120 and 121.

Limit switch mounting assembly 129 extends between and is mounted to blocks 126 and 127. Mounting assembly 129 includes an upwardly extending plate 130 having a segment 132 thereof which extends horizontally and rearward of assembly 129 (FIG. 4). A small plate 134 is centrally fixed to segment 132, and a mounting block 136 extends downward from plate 134. Mounted to block 136 is a limit switch 138 which is actuated by depression of an actuator 140. Limit switch 138 is electrically connected to the air supply control system (not shown) for air cylinder 102, whereby depression of actuator 140 causes a feed of the air supply to both ends of air cylinder assembly 100, which stops piston 110 during its rearward or return stroke. In other words, putting pressure on both sides of the air cylinder piston 110 stops the movement of the piston 110. Mounting assembly 129 includes a cut-out portion 142 which is adapted to receive piston 110 during its return stroke. As seen in FIG. 2, actuator 140 extends below cut-out portion 142 such that piston 110 comes into contact with and depresses actuator 140 during rearward movement of the piston. A cushion element 144 is mounted on upwardly extending plate 130 to absorb the impact when piston 110 comes into contact with mounting assembly 129.

The operation of the above-described apparatus is initiated by adjusting the location of pushers 84 on assembly 22, the lateral position of pusher assembly 22 and cylinder assembly 100 relative to feed surfaces 14, and the position of mounting assembly 129 and the stroke of piston 110 in accordance with the size of article 12 to be advanced across feed tale 10. Referring to FIGS. 7 and 8, pushers 84 can be removed and relocated at any point along the length of pusher assembly 22. This is accomplished by depressing pin 66 against the force of springs 78 located in channel portion 58. Pin 66 is thus withdrawn from pivot mount 92, allowing the right side of pusher 84 to be elevated, as shown in FIG. 8. The pusher is then moved slightly to the right, whereby the left hand pivot mount 92 slides off of its corresponding pin 66.

Pusher 84 can now be relocated at a desirable point in accordance with the length of the articles 12 to be advanced across the feed table. To this end, as viewed in FIG. 8, aperture 94 of pivot mount 92 on the left side of pusher 84 is slid over the appropriate pin 66 until it abuts the wall of channel member 54. Next, the corresponding pin 66 on the right side of channel member 54 is depressed inward against the force of spring 78 until aperture 94 in the right-hand pivot mount 92 is aligned with depressed pin 66. Pin 66 is then released, whereby it extends through right-hand aperture 94 and holds pusher 84 in the position illustrated in FIG. 7.

Next, handle 112 is turned, thereby rotating threaded shafts 115 and 116. This, in turn, moves cradle 119, air cylinder 102 and pusher assembly 22 in a lateral direction. Cradle 119 is moved only to the extent necessary to align articles 12 for movement along the center line of feed table 10 to maintain the in-line feed mode of the apparatus.

The next step in preparing the disclosed apparatus for operation is to set the position of limit switch mounting assembly 129 to establish the length of the return stroke of the piston 110 in air cylinder 102. Once the desired length of the return stroke of piston 110 is determined by the operator, handle 123 is rotated, causing shaft 122 to rotate, and in turn rotate shafts 120, 121 through gear boxes 125, 125 (FIG. 4). The rotation of shafts 120, 121 causes blocks 126, 127 to travel along the length of the shafts, thereby moving mounting assembly 129 longitudinally along the underside of the feed surface 14, as seen in FIG. 2. Assembly 129 is moved along shafts 120, 121 until it is positioned whereby the rearward movement of piston 110 is established. When piston 110 abuts actuator 140, limit switch 138 is activated, feeding the air supply to air cylinder 102, thereby stopping piston 110. Piston 110 is also halted from further rearward movement by its contact with the cut-out portion 142 of assembly 129, and with cushion element 144 (FIG. 2).

From the foregoing description, it is apparent that the feed table advancing mechanism of the present invention has interrelated adjustments to accommodate various sizes of article 12 to be advanced, and in a manner which results in economy of time, and thus increased efficiency, in performing its intended function. If the articles 12 are of short length, pushers 84 are moved closer together to reduce the spacing between articles, thereby allowing more articles to be advanced across the feed table 10, per unit time. Conversely, articles 12 of greater length can also be handled by a simple relocation of pushers 84 away from each other. In correlation to the adjustment of the spaces between pushers 84, the length of stroke of each reciprocal movement of pusher assembly 22 is controlled by setting the position of mounting assembly 129. Thus, for articles 12 of shorter length, the distance pusher assembly 22 travels for each insertion stroke is also shortened. In addition, the center line of pusher assembly 22 can be shifted laterally by turning handle 112 to accommodate articles of varying width. Thus, these adjustments work in combination to prevent wasted travel distance and time of operation.

When the above-described adjustments to the feed mechanism 10 have been completed, operation of the device is commenced by sequentially depositing articles 12 on the pusher assembly 22 at an input station at the far right end, as viewed in FIG. 1. This can be accomplished by means of a vertically disposed hopper feed system, a continuously moving conveyor belt, or any other suitable feeding device. As the articles 12 are deposited on the right side of pusher assembly 22, air cylinder 102 is actuated by suitable air supply control means (not shown) to move piston 110 and pusher assembly 22 to the left. A pusher 84, in its upright position under the influence of weight 96, pushes article 12 to the left. Each pusher 84 is held upright by the interaction between flange 90 and the adjacent pin 66, as illustrated in FIG. 5. When air cylinder 102 has driven piston 110 to its full forward, or left position, the cylinder is operated to return piston 110 and pusher assembly 22 to its original position. Article 12 remains at its advanced position on feed surfaces 14, since the feed surfaces are slightly higher than the horizontal components of U-shaped channels 56, 58.

As pusher assembly 22 moves rearward, or to the right as shown in FIG. 1, pusher 84 is pivoted downward as it contacts the subsequent article 12 waiting to be advanced. This is illustrated in FIG. 6, whereby pusher 84 rotates 90° until arms 86 lie flat against pins 66 and pass beneath the subsequent article 12. When pusher 84 has completely passed beneath article 12, it resumes an upright position under the influence of weight 96, and is ready to advance the subsequent article 12 upon the next forward stroke of piston 110 and pusher assembly 22.

It will be apparent from the foregoing description that the automatic, variable stroke reciprocating feed mechanism and control device of the present invention provide a number of advantages, some of which are inherent in the invention.

Also, it will be apparent that modifications can be made to the apparatus of the present invention without departing from the teachings thereof. Accordingly, the scope of the invention is only to be limited as necessitated by the accompanying claims.

What is claimed is:

1. An apparatus for sequentially advancing a plurality of articles deposited one at a time on one end of a feed table across the feed table to a work station comprising:
   a reciprocating pusher assembly mounted on the feed table and adapted to engage and advance each article across the feed table from the one end when driven forward and to disengage from the article when driven in reverse;
   drive means to reciprocally drive said pusher assembly;
   laterally adjustable means movably supporting said pusher assembly;
   selectively adjustable control means operably connected to said pusher assembly for changing the lateral position of said pusher assembly via said laterally adjustable means;
   said pusher assembly including pushers, whereby the articles being advanced across said feed table by said pushers are maintained in an in-line feed mode regardless of the width of the articles.

2. The apparatus of claim 1 including adjustable control means for selectively varying the distance said pusher assembly travels during each stroke of reciprocal movement, whereby the length of each reciprocal stroke of said pusher assembly and the interval between said pushers are coordinated to accommodate the advancement of articles of varying sizes.

3. The apparatus of claim 2 wherein said drive means comprise a rodless air cylinder having a piston coupled to said pusher assembly, said piston being adapted to travel in a forward and reverse direction along the length of said air cylinder; and a variable pressure air supply source connected to said air cylinder to selectively control the movement of said piston.

4. The apparatus of claim 3 wherein said adjustable control means includes a selectively positionable mounting assembly adapted to abut and limit movement of said piston when said piston is moving in a reverse direction, to thereby selectively vary the length of the reciprocal stroke of said piston and said pusher assembly.

5. The apparatus of claim 4 wherein said selectively positionable mounting assembly includes a limit switch which is actuated when said piston abuts said mounting assembly, said limit switch being adapted to control the supply of pressurized air to said air cylinder to reverse the direction of said piston when actuated.

6. The apparatus of claim 4 including internally threaded blocks fixed to said mounting assembly, an externally threaded rod mechanism rotatably connected to said feed table, said external threads of said rod mechanism mating with said internal threads of said blocks, selectively operable control means connected to said rod mechanism for rotating said rod mechanism and thereby selectively positioning said mounting assembly relative to said piston.

7. The apparatus of claim 1 wherein each pusher is substantially L-shaped having a short leg and a longer leg and each said pusher being pivotably mounted at the corner of the L to said pusher assembly along the longitudinal axis thereof and adapted for 90° rotation relative to said pusher assembly, the longer leg of each of said L-shaped pushers normally being in an upright, article-engaging position and being rotated from said upright position for advancing an article on said feed table when said pusher assembly is driven in a forward direction, to a horizontal position for passage beneath a subsequent article on said feed table when said pusher assembly is driven in a reverse direction and said longer leg engages and pivots under the subsequent article.

8. The apparatus of claim 7 whereby each said pusher includes a weighted member fixed to the underside of said shorter leg which extends away from said upright extending longer leg; whereby said longer leg is maintained in a vertical position by the force of gravity acting upon said weighted member, and whereby said longer leg of said pusher is rotated to a horizontal position against the force of gravity when said pusher assembly is driven in a reverse direction and said longer leg comes into contact with a subsequent article on said feed table.

9. The apparatus of claim 1 including adjustable guide means on said feed table located adjacent said pusher assembly for guiding the articles from said one end of said feed table along and in a channel defined by said guide means to said work station.

10. The apparatus of claim 1 wherein said drive means comprises a rodless air cylinder having a piston connected to said pusher assembly, said piston being adapted to travel in a forward and reverse direction along the length of said air cylinder, and a variable pressure air supply source connected to said air cylinder to selectively control the movement of said piston.

11. The apparatus according to claim 10, wherein said laterally adjustable means includes a laterally adjustable support assembly mounting said air cylinder thereon, said feed table having oppositely disposed end plates mounting said laterally adjustable support assembly, whereby lateral movement of said support assembly causes said air cylinder to slide laterally relative to said feed table.

12. The apparatus of claim 11 wherein said laterally adjustable support assembly includes a generally U-shaped member which supports and engages said air cylinder, internally threaded blocks being fixed to said U-shaped member, externally threaded rods extending laterally across said feed table and mating with the internal threads of said blocks, selectively operable control means connected to said rods for rotating said rods and thereby selectively adjust the lateral position of said air cylinder and said pusher assembly.

13. The apparatus according to claim 1, wherein said pusher assembly further comprises means for removably and relocatably mounting said pushers along the longitudinal axis of said pusher assembly.

14. The apparatus according to claim 1, wherein said pusher assembly comprises a plurality of pin members extending laterally from opposite sides thereof and towards each other in rows extending on said opposite sides of said pusher assembly, socket means on either side of each said pusher for receiving said pin members to pivotally mount said pushers on said pin members; at least one of said rows of pin members being mounted on a flexible member laterally biased by resilient biasing means toward the other row of pin members whereby said one row of pin members is biased towards engagement with corresponding socket means, and whereby lateral movement of said one row of pin members against resilient biasing means and out of engagement with said socket means allows said pusher to be moved from one location on said pusher assembly to another selected location on said pusher assembly.

15. A pusher assembly for advancing articles from an input station to a work station on a feed table comprising:

reciprocal drive means connected to said pusher assembly to drive said pusher assembly in a forward and reverse direction;

a plurality of pushers pivotally and removably mounted to said pusher assembly along the longitudinal axis thereof and adapted for rotation relative to said pusher assembly, whereby each of said pushers rotates from an upright position for advancing an article on said feed table when said pusher assembly is driven in a forward direction, to a horizontal position for passage beneath subsequent articles on said feed table when said pusher assembly is driven in a reverse direction;

a plurality of pin members extending laterally from opposite sides of said pusher assembly and towards each other in two rows extending on said opposite sides of said pusher assembly;

socket means formed on either side of each of said pushers for receiving said pin members to pivotally mount said pushers on said pin members; flexible member for supporting at least one of said rows of pin members; said flexible member including resilient means for laterally biasing said at least one row toward the other row of pin members, whereby said one row of pin members is biased toward engagement with corresponding socket means, and whereby lateral movement of said one row of pin members against said resilient biasing means and out of engagement with said socket means allows said pushers to be moved from one location on said pusher assembly to another selected location on said pusher assembly.

16. The apparatus of claim 15 wherein said resilient biasing means comprise a plurality of springs which bias said flexible member towards engagement of said pin members with said socket means on said pushers.

17. The apparatus of claim 15 wherein said flexible member is a link chain comprising a plurality of inter-connected links with a pin member fixed to each point of interconnection of said links, whereby said link chain is inherently laterally flexible against said resilient biasing means.

18. The pusher assembly of claim 15 wherein said flexible member is a link chain comprising a plurality of inter-connected links with a pin member fixed to each point of interconnection of said links, whereby said link chain is inherently laterally flexible against said resilient biasing means.

19. The pusher assembly according to claim 15, wherein each of said pushers comprises one normally upright leg and one other leg at an angle relative to said one leg, said socket means being formed on either side of said leg.

20. The pusher assembly of claim 19 whereby each said pusher includes a weighted member fixed to the other leg of said pusher which extends away from said upright extending leg, whereby said upright extending leg is maintained in a vertical position by the force of gravity acting upon said weighted member, and said upright extending leg of said pusher is rotated to a horizontal position against the effect of gravity when said pusher assembly is driven in a reverse direction and said upright extending leg comes into contact with a subsequent article on said feed table.

21. The pusher assembly according to claim 20 wherein each pusher has a width sufficient to engage articles of various widths, wherein said one leg of each pusher is longer than said other leg, said weight being attached to the bottom surface of said shorter other leg and wherein said longer one leg is bifurcated so as to have a U-shaped space between spaced apart fingers of said one leg.

22. The pusher assembly according to claim 15, wherein said flexible means comprises a resilient biasing means having a plurality of springs, and a flexible member biased by said plurality of springs toward engagement of said pin members with said socket means on said pushers.

23. An apparatus for advancing a plurality of articles across a feed table to a work station comprising:

means for receiving articles deposited at an input station of said feed table;

a reciprocating pusher assembly having variable positionable pushers rotatably mounted thereon to engage and advance the articles across said feed table from said input station when driven forward and to disengage from the articles when driven in reverse;

drive means for reciprocally driving said pusher assembly, said drive means including a rodless air cylinder mounted for limited lateral movement relative to said feed table and having a reciprocally driven piston attached to said pusher assembly whereby said piston is driven in a forward and reverse direction;

a selectively variable pressure air supply source connected to said air cylinder to control the reciprocal movement of said piston;

an adjustable mounting assembly movably connected to said feed table and adapted to abut and stop movement of said piston at a selected point when said piston is driven in said reverse direction, whereby the length of stroke of said piston and said pusher assembly is selectively adjusted;

a laterally movable mounting assembly fixed to said air cylinder; and selectively operable lateral control means operably connected to said laterally movable mounting assembly and said feed table to laterally shift the longitudinal axis of said cylinder and pusher assembly relative to said feed table, whereby the path of advancement of the articles across said feed table can be selectively adjusted.

24. The apparatus of claim 23 including a limit switch mounted on said adjustable mounting assembly, said limit switch being connected between said air cylinder and said air supply source to control the movement of said piston in said air cylinder when actuated, said limit switch being coupled to actuating means adapted to be actuated when said piston abuts said adjustable mounting assembly during said reverse movement of said piston to stop the reverse movement of said piston upon abutment; and adjusting means operably connected to said feed table and said adjustable mounting assembly to selectively vary the location of said limit switch and thereby selectively vary the length of each stroke of said piston and said pusher assembly.

* * * * *